(12) United States Patent
Teragawa et al.

(10) Patent No.: US 10,451,923 B2
(45) Date of Patent: Oct. 22, 2019

(54) DISPLAY DEVICE

(71) Applicant: SAKAI DISPLAY PRODUCTS CORPORATION, Sakai-shi, Osaka (JP)

(72) Inventors: Daisuke Teragawa, Sakai (JP); Noriaki Miyoshi, Sakai (JP); Tomohiro Asamizu, Sakai (JP)

(73) Assignee: SAKAI DISPLAY PRODUCTS CORPORATION, Sakai-shi, Osaka (JP)

( * ) Notice: Subject to any disclaimer, the term of this patent is extended or adjusted under 35 U.S.C. 154(b) by 0 days.

(21) Appl. No.: 16/076,668

(22) PCT Filed: Feb. 8, 2016

(86) PCT No.: PCT/JP2016/053704
§ 371 (c)(1),
(2) Date: Aug. 8, 2018

(87) PCT Pub. No.: WO2017/138080
PCT Pub. Date: Aug. 17, 2017

(65) Prior Publication Data
US 2019/0049793 A1    Feb. 14, 2019

(51) Int. Cl.
*F21S 2/00*    (2016.01)
*G02F 1/1335*    (2006.01)

(52) U.S. Cl.
CPC .. *G02F 1/133606* (2013.01); *G02F 1/133605* (2013.01); *G02F 1/133608* (2013.01); *G02F 1/133603* (2013.01); *G02F 2001/133607* (2013.01); *G02F 2001/133628* (2013.01)

(58) Field of Classification Search
CPC ......... G02F 1/133605; G02F 1/133606; G02F 1/133608; F21S 2/00
See application file for complete search history.

(56) References Cited

U.S. PATENT DOCUMENTS

2014/0218894 A1* 8/2014 Tanabe .............. G02F 1/133603
362/97.2

FOREIGN PATENT DOCUMENTS

JP    2002-169479 A    6/2002

* cited by examiner

*Primary Examiner* — Thomas M Sember
(74) *Attorney, Agent, or Firm* — ScienBiziP, P.C.

(57) ABSTRACT

Provided is a display device wherein the uniformity of luminance distribution on a display surface can be improved. The display device includes: a rectangular display panel on one surface of which an image is displayed; a substrate disposed to face the other surface of the display panel opposite to the one surface, and having a plurality of light sources mounted thereon; a diffuser disposed between the display panel and the substrate; and a supporting member supporting the peripheral edge of the diffuser, and having an opening through which light from the light sources passes. The display device further includes a reflecting member provided around each of the light sources close to the four corners of the display panel, and reflecting the light from the light sources toward the corners.

9 Claims, 10 Drawing Sheets

DISPLAY DEVICE

TECHNICAL FIELD

The present invention relates to a display apparatus with a direct backlight module.

BACKGROUND ART

Recently, display apparatuses each including a liquid crystal panel as an image display section are widely used. The display apparatuses each include a backlight module on the back side of the liquid crystal panel.

Various designs are employed for arrangement of the backlight module. One example of employed backlight module arrangement is a direct arrangement of the backlight module in which a light source is opposed to the entirety of a back surface of the liquid crystal panel. For example, Patent Literature 1 discloses a backlight device in which a cylindrical light source and a reflection body are disposed in a flat casing with an opening at an upper end thereof and a light transmission-diffusion body is disposed at the opening of the casing.

A display apparatus including a backlight device such as above displays an image on a front surface of the liquid crystal panel in a manner that light from the light source is diffused by the light transmission-diffusion body and the diffused light is allowed to pass through the liquid crystal panel while being modulated by the liquid crystal panel.

CITATION LIST

Patent Literature

[Patent Literature 1]
Japanese Patent Application Laid-Open Publication No, 2002-169479

SUMMARY OF INVENTION

Technical Problem

In Patent Literature 1 described above, reflection bodies having different reflection properties are respectively disposed on a bottom inner surface and a side inner surface of the casing to even out light quantities at a part of a light irradiated surface having low luminance and at a part thereof having high luminance, thereby reducing unevenness in luminance.

However, in the backlight device disclosed in Patent Literature 1, light reflected by the side surface of the casing is lead to an inner region of the light irradiated surface with a result that sufficient luminance cannot be obtained at four corners of the light irradiated surface.

The present invention has been made in view of the foregoing and has its object of providing a display apparatus in which degree of evenness of luminance distribution over a display surface is increased.

Solution to Problem

A display apparatus of an embodiment of the present application includes a rectangular display panel, a substrate, a diffusion plate, a support member, and reflection members. The display panel has one surface on which an image is displayed. The substrate faces another surface of the display panel which is opposite to the one surface. A plurality of light sources are mounted on the substrate. The diffusion plate is disposed between the display panel and the substrate. The support member has an opening through which light from the plurality of light sources passes, and supports a peripheral portion of the diffusion plate. The reflection members are respectively provided around at least four light sources among the plurality of light sources located near four corners of the display panel, and each reflect light from a corresponding one of the at least four light sources toward a corresponding one of the four corners of the display panel.

Advantageous Effects of Invention

According to an embodiment of the present application, degree of evenness of luminance distribution over the display surface can be increased.

DESCRIPTION OF EMBODIMENTS

The present invention will be described below with reference to drawings that illustrate embodiments thereof.

First Embodiment

Figure 1:
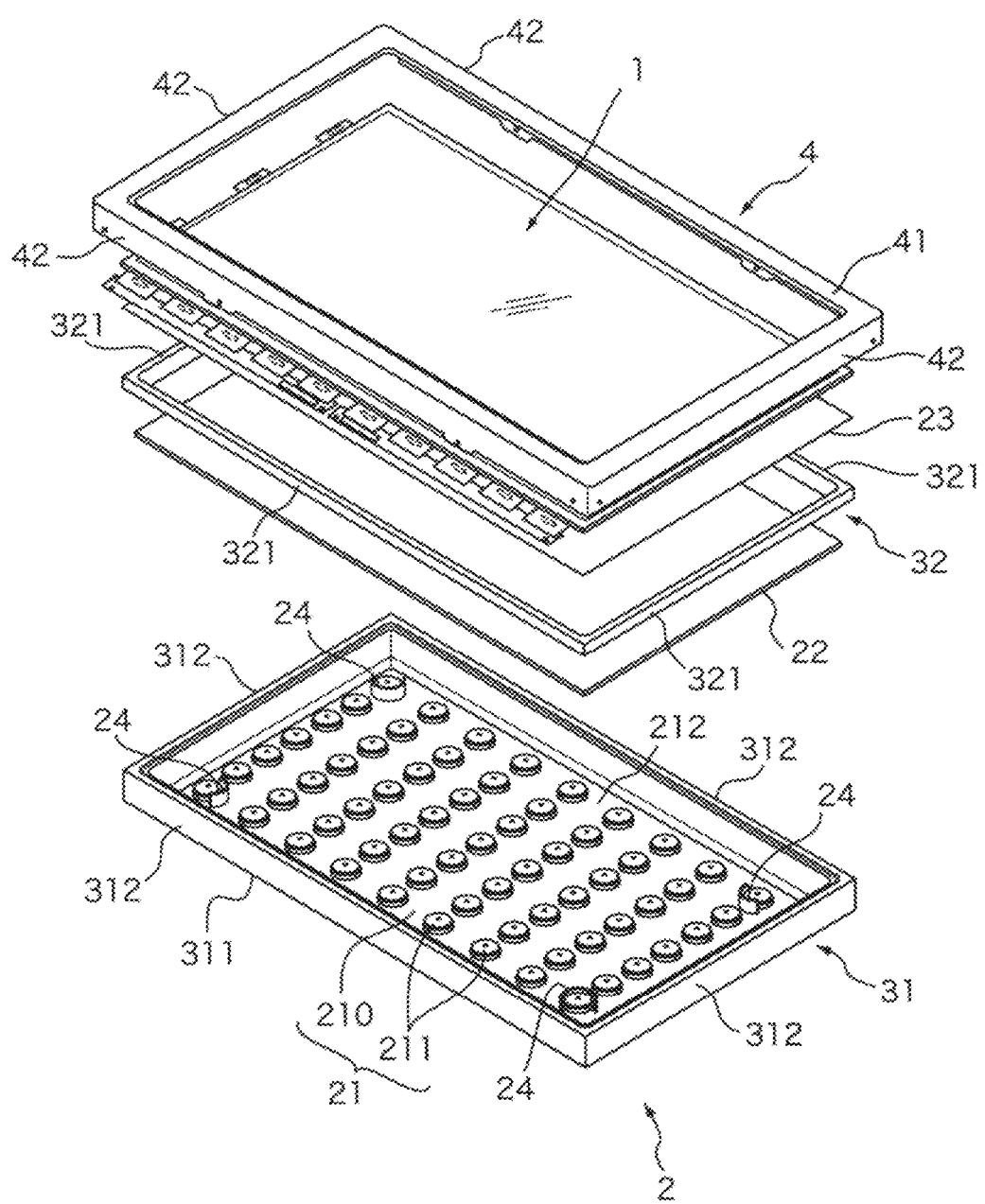
FIG. 1 is an exploded perspective view of a display apparatus according to a first embodiment.
Figure 2:
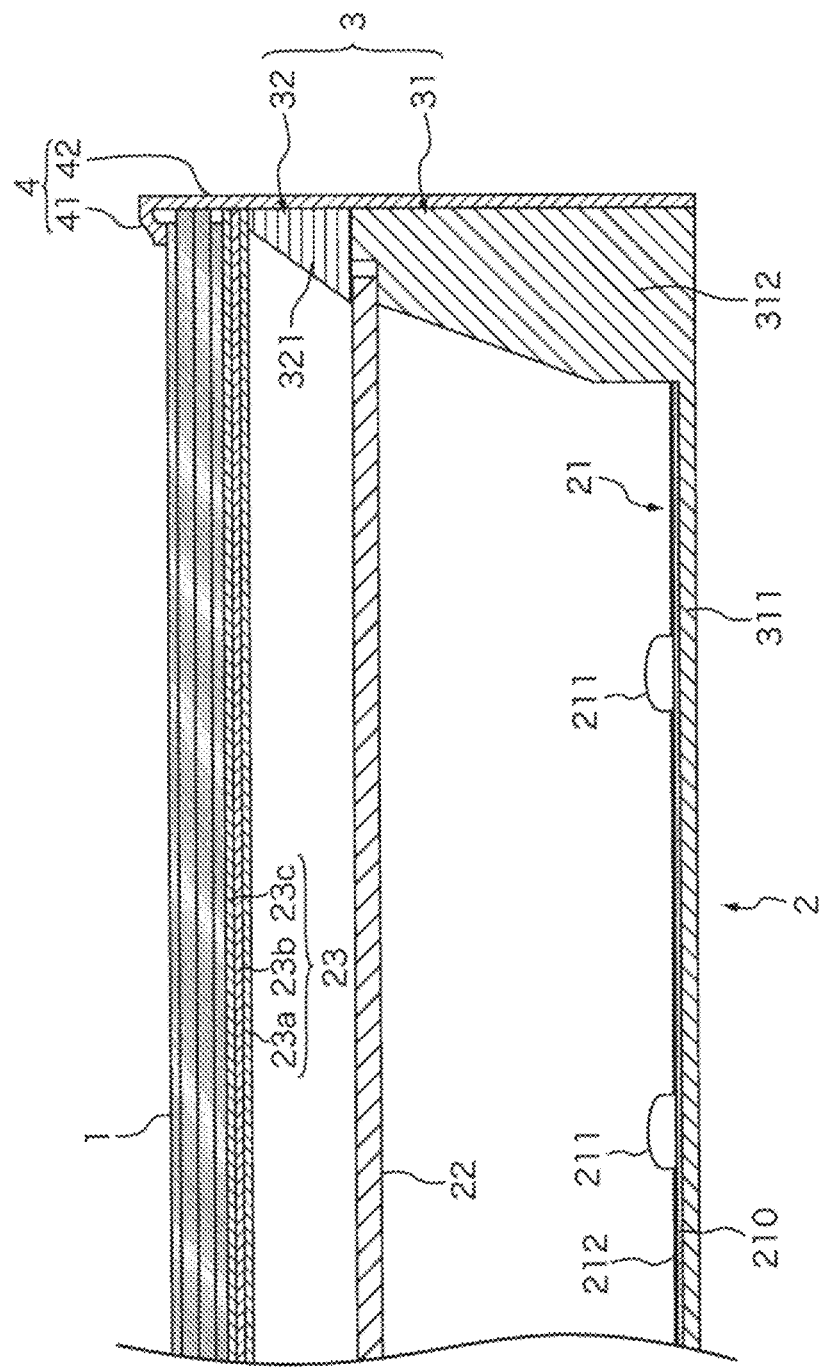
FIG. 2 is a vertical cross-sectional view of the display apparatus according to the first embodiment.

FIG. 1 is an exploded perspective view of a display apparatus according to a first embodiment. FIG. 2 is a vertical cross-sectional view of the display apparatus according to the first embodiment. The display apparatus according to the present embodiment is a liquid crystal display apparatus for example including a liquid crystal panel 1 on a front side thereof and a light source section 2 on a back side thereof.

The liquid crystal panel 1 is a rectangular display panel including a plurality of liquid crystal display elements arranged in a matrix for displaying an image on a front surface of the liquid crystal panel 1.

The light source section 2 is a direct backlight module that emits light from the back of the liquid crystal panel 1. The light source section 2 includes a light emitting diode (LED) substrate 21, a diffusion plate 22, and an optical sheet 23, and irradiates the liquid crystal panel 1 with light emitted from light sources (LED chips 211) on the LED substrate 21 through the diffusion plate 22 and the optical sheet 23.

The LED substrate 21 includes a rectangular substrate 210 and the plurality of LED chips 211, 211, . . . , 211 mounted on the substrate 210 at substantially regular intervals in a longitudinal direction and a short direction of the substrate 210. The LED chips 211 each are for example a package including a light emitting diode element, a fluorescent body covering the light emitting diode element, and an accommodation body that accommodates them. Also, reflection members 24, 24, 24, and 24 are respectively provided around LED chips 211, 211, 211, and 211 located near four corners of the liquid crystal panel 1. Further, the LED substrate 21 has a surface on which a reflection sheet 212 having high reflectivity is disposed. The reflection sheet 212 is preferably formed of a reflection body for example having a light reflectivity of at least 85%. Alternatively, the surface of the substrate 210 may be coated with white paint.

The diffusion plate 22 is a rectangular plate body having a specific thickness and made of a synthetic resin having high transparency, such as an acrylic resin or a polycarbonate resin. The diffusion plate 22 includes a number of diffusion particles dispersed therein, and has a function of diffusing light passing through the diffusion plate 22. That is, light of the LED chips 211 entering the diffusion plate 22 from one of surfaces of the diffusion plate 22 is diffused by the diffusion particles therein when traveling in a thickness direction of the diffusion plate 22. Part of the diffused light passes toward another surface of the diffusion plate 22 (front side of the display, apparatus), while another part thereof is reflected toward the one surface of the diffusion plate 22 (back side of the display apparatus).

The optical sheet 23 is a transparent sheet having a specific optical property, and is formed of a lamination body of a plurality of sheets. The optical sheet 23 in the present embodiment is formed of a lamination body of a diffusion sheet 23a, a lens sheet 23b, and a reflective polarizing sheet 23c. Note that the number of sheets and the configuration of the sheets constituting the optical sheet 23 can be altered as appropriate according to required specification such as luminance or optical property.

The display apparatus includes a panel chassis 3 that accommodates the LED substrate 21. The panel chassis 3 in the present embodiment includes a backside panel chassis 31 that is a shallow bottomed casing and a frontside panel chassis 32 that is a frame-shaped frame body with an opening at a central part thereof.

The backside panel chassis 31 includes a rectangular bottom surface portion 311 and side walls 312. The LED substrate 21 on which the LED chips 211 are mounted is attached to the bottom surface portion 311. The side walls 312 stand upright from the peripheral edge of the bottom surface portion 311. The backside panel chassis 31 is made of for example a metal excellent in thermal conductivity, such as aluminum, for releasing heat emitted from the LED chips 211. The side walls 312 each have an inner surface that is an inclined surface inclined obliquely outward between the bottom surface portion 311 and the diffusion plate 22 (i an inclined surface of each side wall 312 of which thickness gradually decreases in a tapered manner in a height direction thereof) and that reflects incident light toward the front side of the display apparatus. In this connection, the inclined surfaces of the side walls 312 are each preferably formed of a reflection body for example having a light reflectivity of at least 85%. Alternatively, a reflection sheet having high reflectivity may be provided on or near the inclined surfaces or white paint may be applied onto reflection surfaces.

The frontside panel chassis 32 is a frame-shaped frame body with an opening at a central part thereof. The frontside panel chassis 32 includes four peripheral walls 321. The frontside panel chassis 32 and the backside panel chassis 31 hold a peripheral portion of the diffusion plate 22 therebetween to support the diffusion plate 22. The peripheral walls 321 each have an inner surface that is an inclined surface inclined obliquely outward between the diffusion plate 22 and the optical sheet 23 (i.e., an inclined surface of each peripheral wall 321 of which thickness gradually decreases in a tapered manner in a height direction thereof and that reflects incident light toward the front side of the display apparatus. In this connection, the inclined surfaces of the peripheral walls 321 are each preferably formed of a reflection body for example having a light reflectivity of at least 85%. Alternatively, a reflection sheet having high reflectivity may be provided on or near the inclined surfaces or white paint may be applied onto reflection surfaces.

The display apparatus further includes a frame-shaped bezel 4 that covers a peripheral portion of the liquid crystal panel 1 from the front side of the display apparatus. The bezel 4 is a frame body slightly larger than the panel chassis 3, and has an opening at a central part thereof. The bezel 4 includes a frame portion 41 that covers the peripheral portion of the liquid crystal panel 1 from the front of the liquid crystal panel 1 and side walls 42 that cover side outer surfaces of the panel chassis 3. When the bezel 4 is set in a state in which the diffusion plate 22 is held between the backside panel chassis 31 and the frontside panel chassis 32 and the optical sheet 23 and the liquid crystal panel 1 are placed on the frontside panel chassis 32, the frame portion 41 is in contact at an inner surface thereof with the peripheral portion of the liquid crystal panel 1 on the front side thereof while the side walls 42 are in contact at inner surfaces thereof with side outer surfaces of the backside panel chassis 31 and the frontside panel chassis 32. Thus, the liquid crystal panel 1 is supported together with the optical sheet 23 in a manner to be held between the frontside panel chassis 32 and the frame portion 41 of the bezel 4.

The display apparatus according to the present embodiment is configured as above. The display apparatus performs image display in a manner that the liquid crystal panel 1 is irradiated with light from the back using the light source section 2 and light transmittance of each of the liquid crystal display elements (pixels) arranged in the liquid crystal panel 1 is adjusted by driving and controlling the liquid crystal display elements by a non-illustrated drive circuit.

Figure 3:
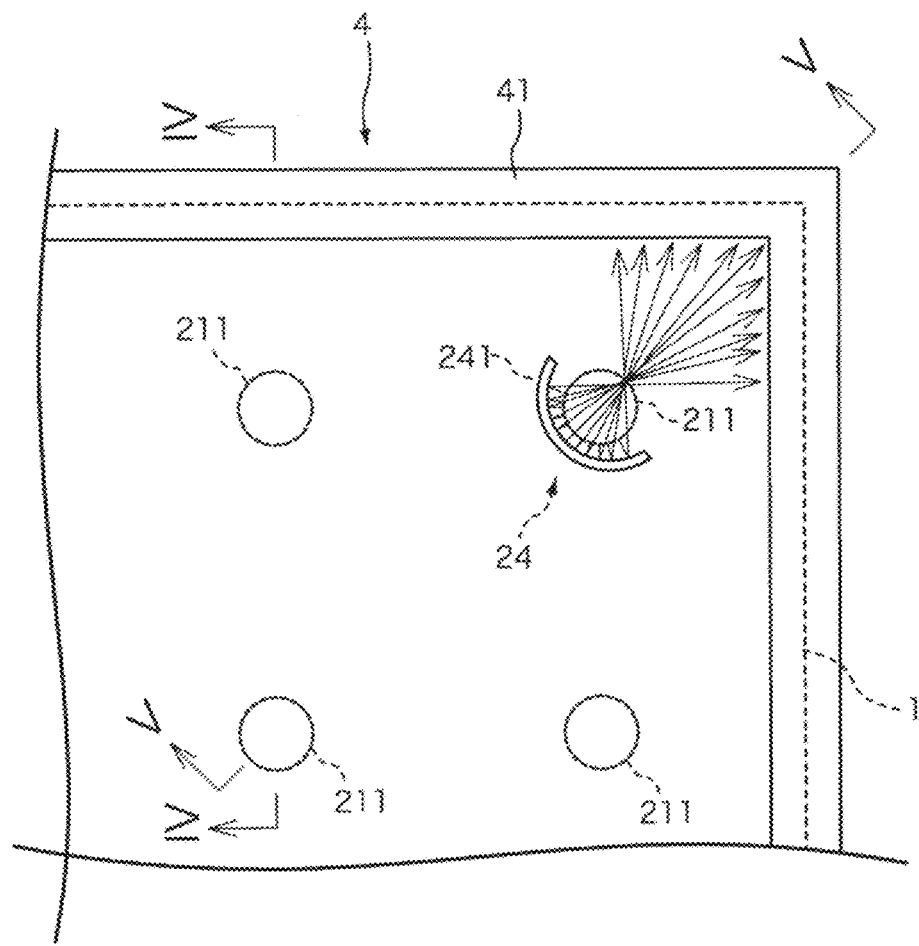
FIG. 3 is a partial front view of the display apparatus according to the first embodiment.
Figure 4:
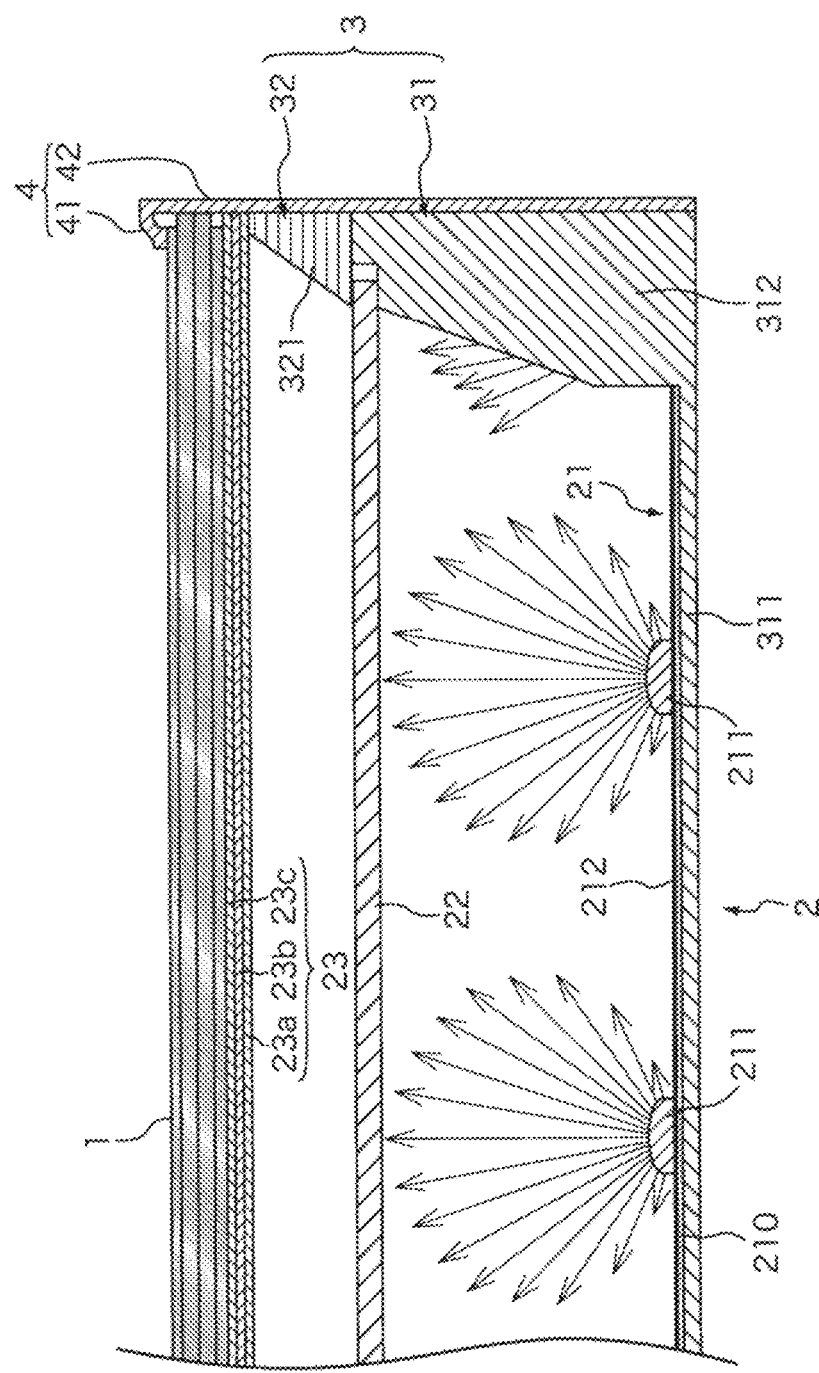
FIG. 4 is a cross-sectional view taken along a line IV-IV in FIG. 3.
Figure 5:
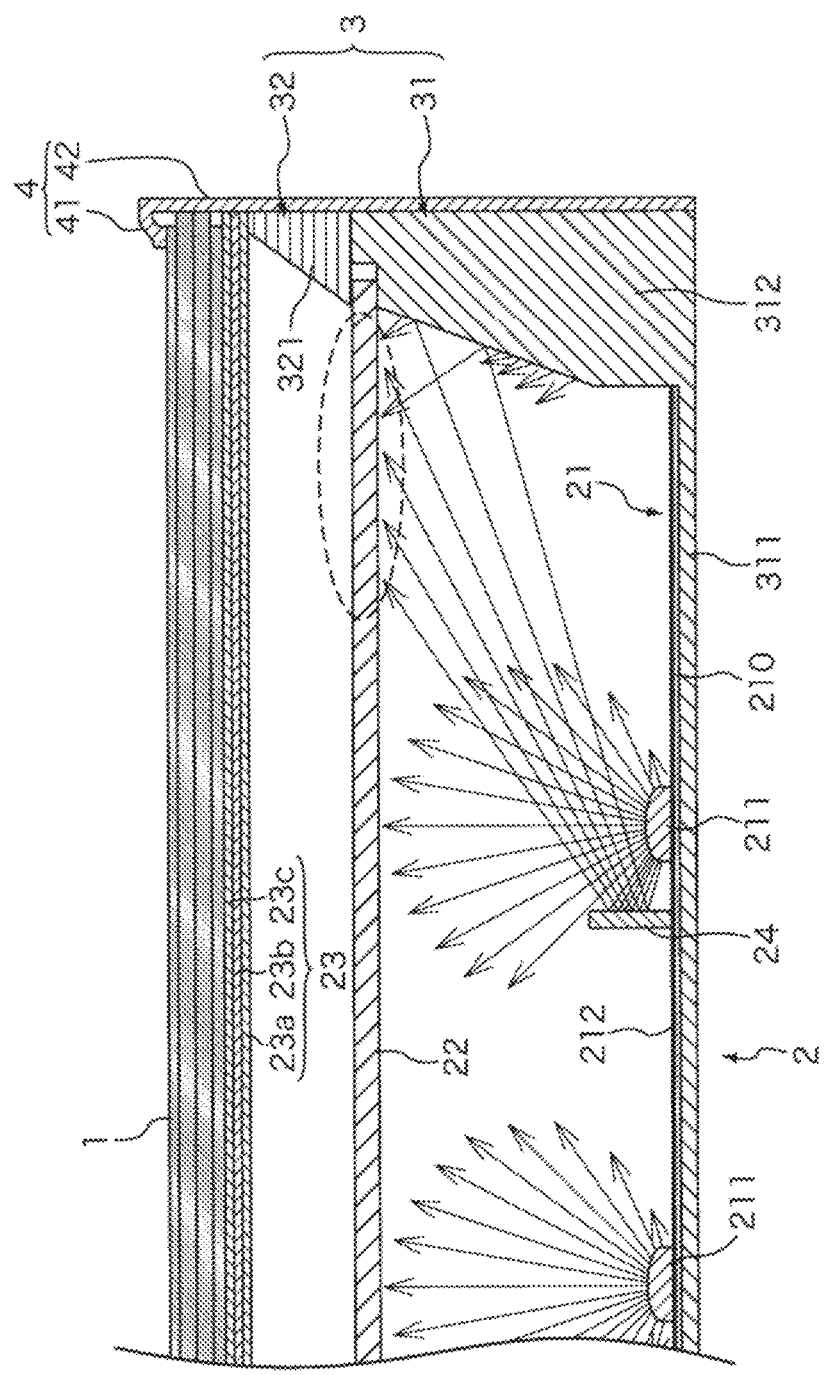
FIG. 5 is a cross-sectional view taken along a line V-V in FIG. 3.

FIG. 3 is a partial front view of the display apparatus according to the first embodiment. FIG. 4 is a cross-sectional view taken along a line IV-IV in FIG. 3. FIG. 5 is a cross-sectional view taken along a line V-V in NG 3. As described above, the reflection members 24 are provided around the LED chips 211 located near the four corners of the liquid crystal panel 1. In the present embodiment, the LED chips 211, 211, . . . , 211 are mounted on the substrate 210 at substantially regular intervals in the longitudinal direction and the short direction of the substrate 210. The reflection members 24 are respectively provided around four LED chips 211, 211, 211, and 211 located at four corners among the thus arranged LED chips 211, 211, . . . 211.

As illustrated in FIG. 3, each of the reflection members 24 surrounds almost a half region of a circumferential surface of a corresponding one of the LED chips 211 located at the four corners. The reflection members 24 are each constituted by a surrounding wall 241 having the shape of a half hollow cylinder that is open toward a corresponding one of the four corners of the liquid crystal panel 1. That is, each of the reflection members 24 is constituted by the surrounding wall 241 that has a concave surface within a range from 90° to 270° relative to a straight line connecting the center of a light source of the corresponding one of the LED chips 211 and a corresponding one of four corners of the substrate 210.

Each of the reflection members 24 reflects light emitted from the corresponding one of the LED chips 211 located at the four corners toward a corresponding one of the four corners of the liquid crystal panel 1 that is closest to the reflection member 24. In this connection, the reflection members 24 are each preferably formed of a reflection body for example having a light reflectivity of at least 85%. Alternatively, a reflection sheet having high reflectivity may be provided on or near a reflection surface of each reflection member 24 or white paint may be applied onto the reflection surface of each reflection member 24.

When light from the LED chips 211, 211, ..., 211 passes through the diffusion plate 22, the diffusion plate 22 diffuses the light using the diffusion particles therein. Therefore, the diffusion plate 22 has a function of evening out luminance distribution of light passing toward the liquid crystal panel 1 over the surface thereof. In general, however, distance from light sources such as LEDs to a panel chassis is longer in an oblique direction than in a vertical direction or a horizontal direction. As a result, a light quantity tends to decrease in four corner regions of a panel and therefore the four corner regions tend to be noticeably dark relatively when compared to a region of the panel other than the four corner regions.

In view of the foregoing, the reflection members 24 are provided around the LED chips 211 located near the four corners of the liquid crystal panel 1 in the present embodiment. In the above configuration, not only light emitted front these LED chips 211 toward the four corners of the liquid crystal panel 1 but also light reflected by the reflection members 24 reaches the four corners of the liquid crystal panel 1.

Therefore, a light quantity of light reaching the four corners of the liquid crystal panel 1 can be increased in the first embodiment relatively when compared to a configuration without the reflection members 24. Thus, reduction in light quantity in the vicinities of the four corners of the liquid crystal panel 1 can be prevented and degree of evenness of luminance distribution over the surface of the liquid crystal panel 1 can be increased.

In particular, even in a display apparatus having a narrow frame that cannot sufficiently cover the periphery of a panel, evenness of luminance distribution over an effective display surface can be ensured. Moreover, even in a multi-display apparatus in which a plurality of the display apparatuses according to the present embodiment are arranged side by side, dark portions at respective four corner regions of adjacent display apparatuses can be made inconspicuous.

Note that according to luminance required at the four corners of the liquid crystal panel 1, appropriate alterations can be made on for example: width of the reflection members 24; angle range within which the surrounding walls 241 are provided; height of the reflection members 24 from the surface of the substrate 210; inclination angle of inner circumferential surfaces of the reflection members 24; and distance between the reflection members 24 and the corresponding LED chips 211. For example, when width or height of one of the reflection members 24 is increased, luminance increases at one of the four corners of the liquid crystal panel 1 closest to the reflection member 24, but decreases in a region opposite to the corner with respect to the reflection member 24. Therefore, it is preferable to appropriately determine for example width and height of the reflection members 24, inclination angle of their inner circumferential surfaces, and distance between the reflection members 24 and the corresponding LED chips 211 according to the required luminance to reduce variation in luminance distribution over the surface of the liquid crystal panel 1.

Figure 6:
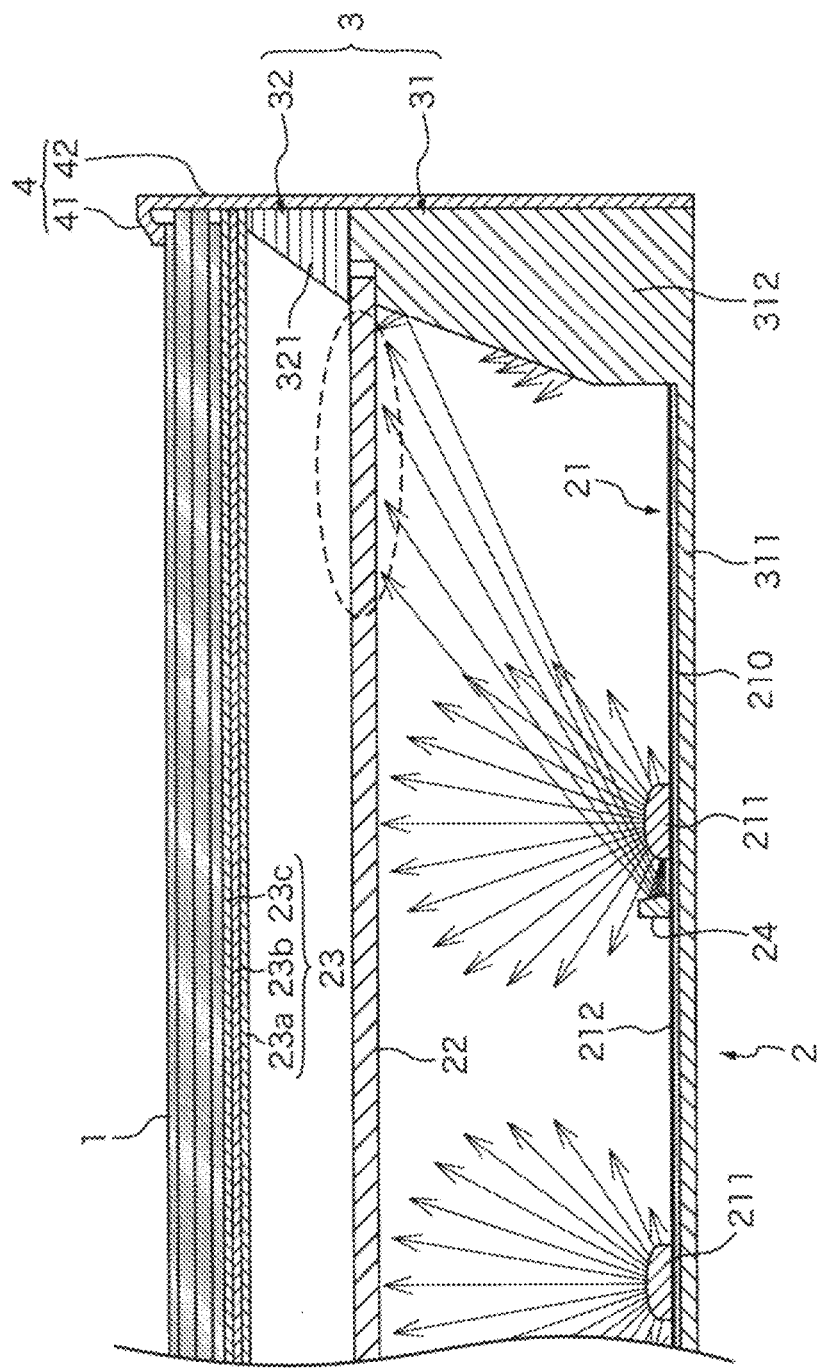
FIG. 6 is a cross-sectional view illustrating a first variation of a reflection member.

FIG. 6 is a cross-sectional view illustrating a first variation of the reflection members 24. FIG. 6 illustrates an example of the reflection members 24 of which inclination angle of the inner circumferential surface and height from the surface of the substrate 210 are altered. Although the reflection member 24 illustrated in FIG. 5 is constituted by the surrounding wall 241 that is perpendicular to the substrate 210, the reflection member 24 illustrated in FIG. 6 is constituted by a surrounding wall 241 that has an inner circumferential surface inclined downward toward the LED chip 211. Note that the inclination angle of the inner circumferential surface is adjusted such that light from the LED chip 211 is reflected by the inner circumferential surface toward a corresponding one of the four corners of the liquid crystal panel 1. When compared to the example illustrated in FIG. 5, the reflection member 24 of the variation illustrated in FIG. 6 can reflect light emitted at a relatively small angle front the LED chip 211 toward the corresponding one of the four corners of the liquid crystal panel 1. Therefore, height of the reflection member 24 from the surface of the substrate 210 can be reduced.

Figure 7:
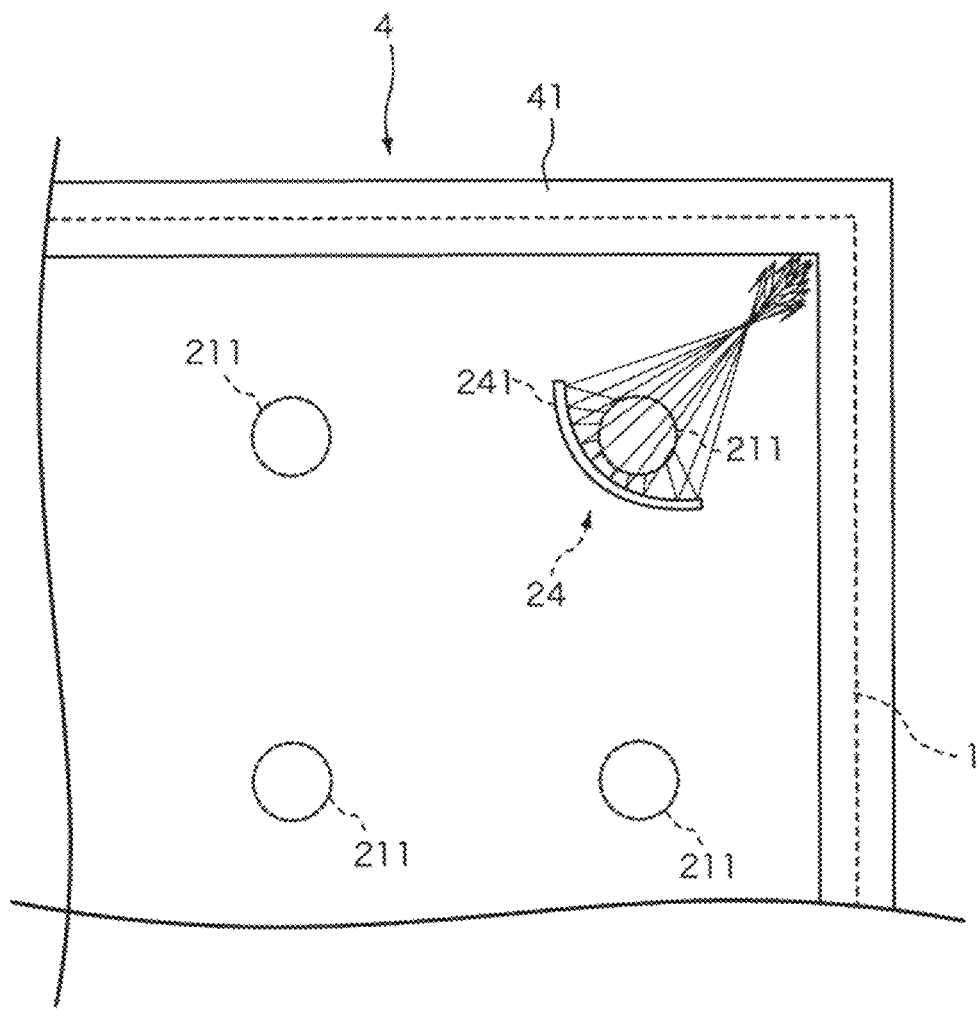
FIG. 7 is a partial front view illustrating second variation of the reflection member.

FIG. 7 is a partial front view illustrating a second variation of the reflection members 24. Although the present embodiment has been described about a configuration in which the reflection members 24 are each constituted by the surrounding wall 241 having the shape of a half hollow cylinder in a plan view, the shape of the inner circumferential surface is not limited to be circular in the plan view. So long as the shape of the inner circumferential surface of the surrounding wall 241 of the reflection member 24 is adjusted such that light from the LED chip 211 is reflected by the inner circumferential surface toward a corresponding one of the four corners of the liquid crystal panel 1, the shape of the inner circumferential surface may be elliptical or a combination of any other curves in the plan view. In the second variation illustrated in FIG. 7, the inner circumferential surface of the surrounding wall 241 has an elliptical shape in a plan view so that light reflected by the inner circumferential surface of the surrounding wall 241 is concentrated on the corresponding one of the four corners of the liquid crystal panel 1.

Further, although the present embodiment has been described about a configuration in which the reflection members 24 are provided around the LED chips 211, 211, 211, and 211 located at the four corners, location of the reflection members 24 can be altered as appropriate according to arrangement of the LED chips 211. For example, in a configuration in which at least two LED chips 211 are located closest to one corner of the liquid crystal panel 1, the reflection members 24 may be respectively provided around the at least two LED chips 211.

Second Embodiment

Although the reflection members 24 each in the shape of a half hollow cylinder are provided in the first embodiment, the shape of the reflection members is not limited to the half hollow cylinder.

The following describes a second embodiment in which reflection members 25 each formed of a combination of three rectangular plate bodies are provided. Note that an overall configuration of a display apparatus in the second embodiment is similar to that in the first embodiment. Therefore, description thereof is omitted.

Figure 8:
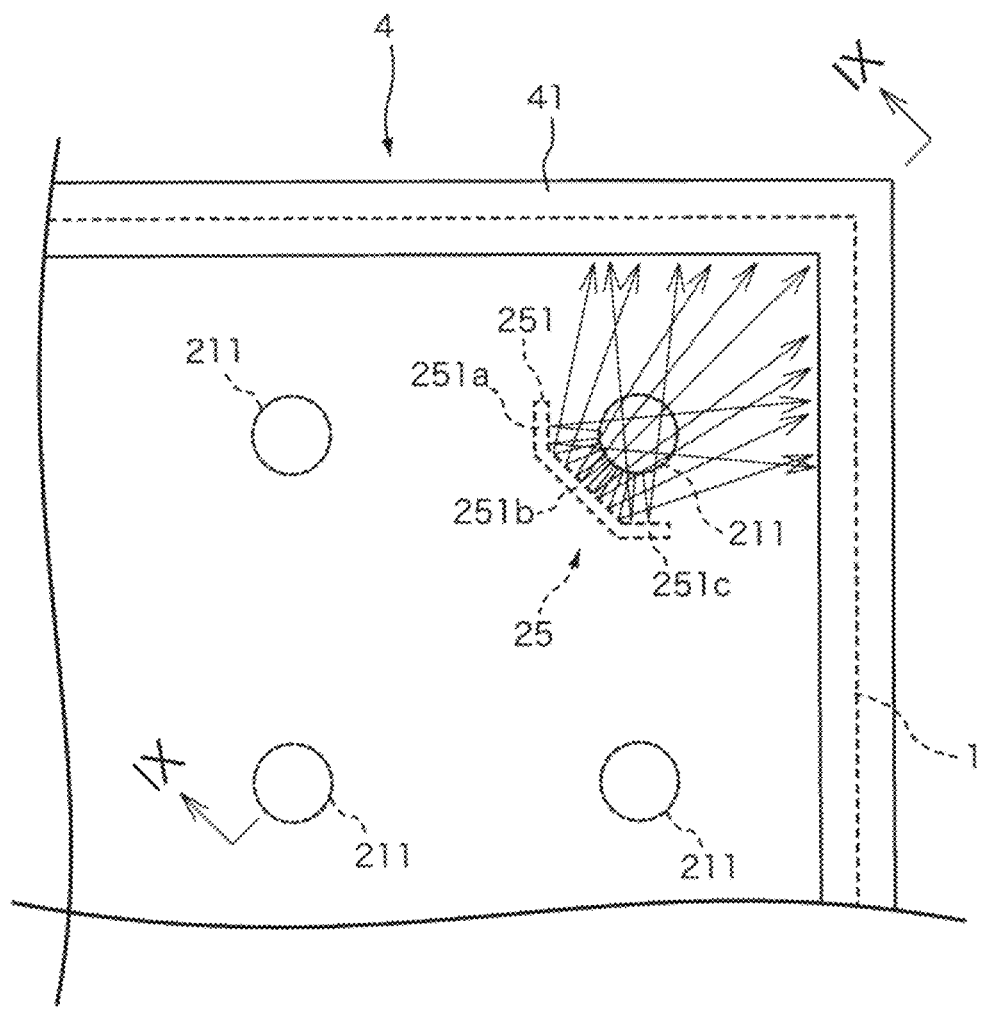
FIG. 8 is a partial front view of a display apparatus according to a second embodiment.
Figure 9:
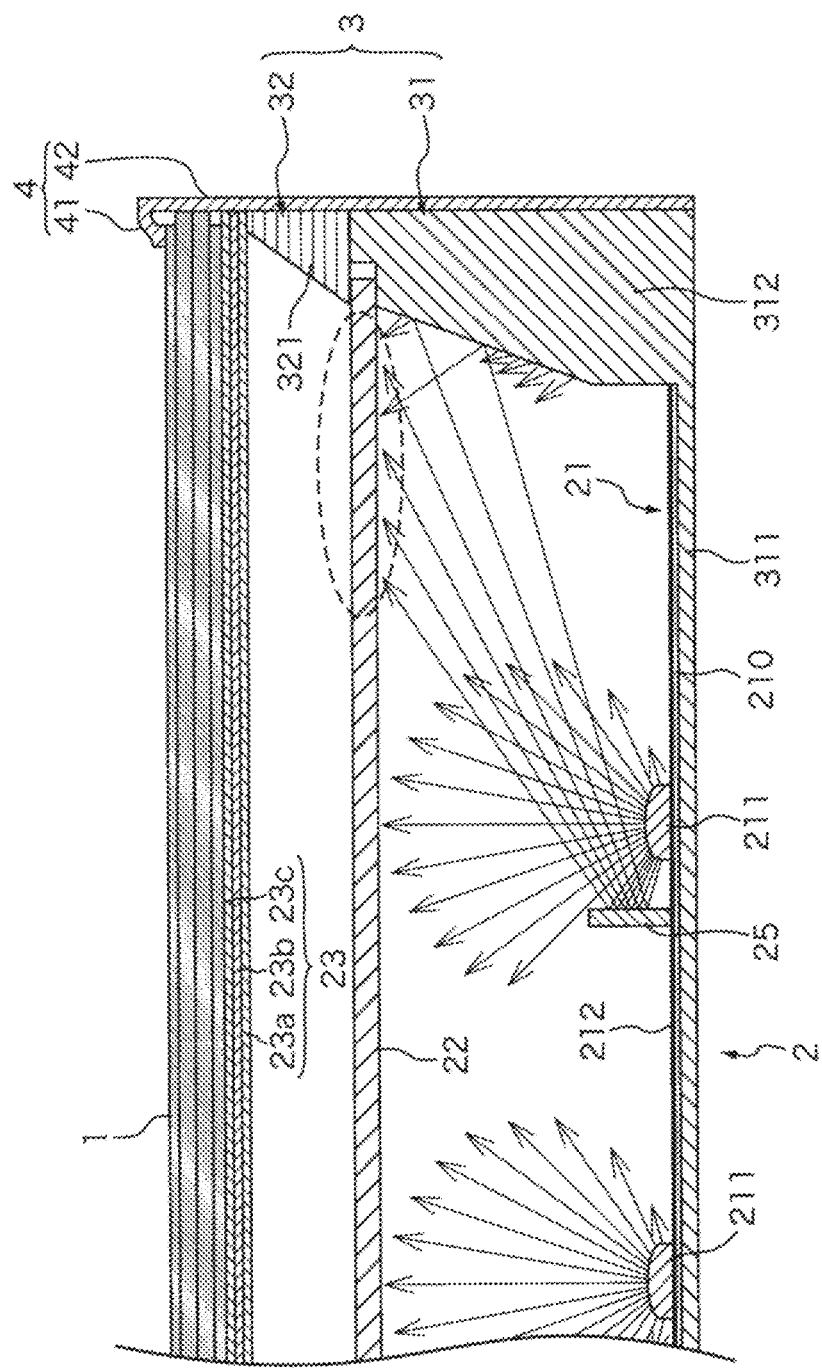
FIG. 9 is a cross-sectional view taken along a line IX-IX in FIG. 8.

FIG. 8 is a partial front view of the display apparatus according to the second embodiment. FIG. 9 is a cross-sectional view taken along a line IX-IX in FIG. 8. Similarly to the first embodiment, the reflection members 25 are provided around the LED chips 211 located near the four corners of the liquid crystal panel 1 in the second embodiment. The reflection member 25 illustrated in FIG. 8 is a combination of three rectangular plate bodies 251a to 251c and constituted by a surrounding wall 251 open toward a corresponding one of the four corners of the liquid crystal panel 1. The reflection member 25 is arranged such that a surface of the plate body 251b is substantially orthogonal to a straight line connecting the center of a light source of a corresponding one of the LED chips 211 and a corresponding one of the four corners of the substrate 210.

Each of the reflection members 25 reflects light emitted from the corresponding one of the LED chips 211 located at the four corners toward a corresponding one of the four corners of the liquid crystal panel 1 that is closest to the reflection member 25. In this connection, the reflection members 25 are each preferably formed of a reflection body for example having a light reflectivity of at least 85%. Alternatively, a reflection sheet having high reflectivity may be provided on a reflection surface of each reflection member 25 or white paint may be applied onto the reflection surface of each reflection member 25.

When light from the LED chips 211, 211, ..., 211 passes through the diffusion plate 22, the diffusion plate 22 diffuses the light using the diffusion particles therein. Therefore, the diffusion plate 22 has the function of evening out luminance distribution of light passing toward the liquid crystal panel 1 over the surface thereof. In general, however, distance from light sources such as LEDs to a panel chassis is longer in an oblique direction than in a vertical direction or a horizontal direction. As a result, a light quantity tends to decrease in four corner regions of a panel and therefore the four corner regions tend to be noticeably dark relatively when compared to a region of the panel other than the four corner regions.

In view of the foregoing, the reflection members 25 are provided around the LED chips 211 located near the four corners of the liquid crystal panel 1 in the present embodiment. In the above configuration, not only light emitted from these LED chips 211 toward the four corners of the liquid crystal panel 1 but also light reflected by the reflection members 25 reaches the four corners of the liquid crystal panel 1.

Therefore, a light quantity of light reaching the four corners of the liquid crystal panel 1 can be increased also in the second embodiment relatively when compared to a configuration without the reflection members 25. Thus, reduction in light quantity in the vicinities of the four corners of the liquid crystal panel 1 can be prevented and degree of evenness of luminance distribution over the surface of the liquid crystal panel 1 can be increased.

Note that although the second embodiment has been described about a configuration in which the reflection members 25 each include the plate bodies 251a to 251c standing upright from the substrate 210, each of the plate bodies 251a to 251c may have an inclined surface inclined downward toward the corresponding LED chip 211 as illustrated in FIG. 6.

Figure 10:
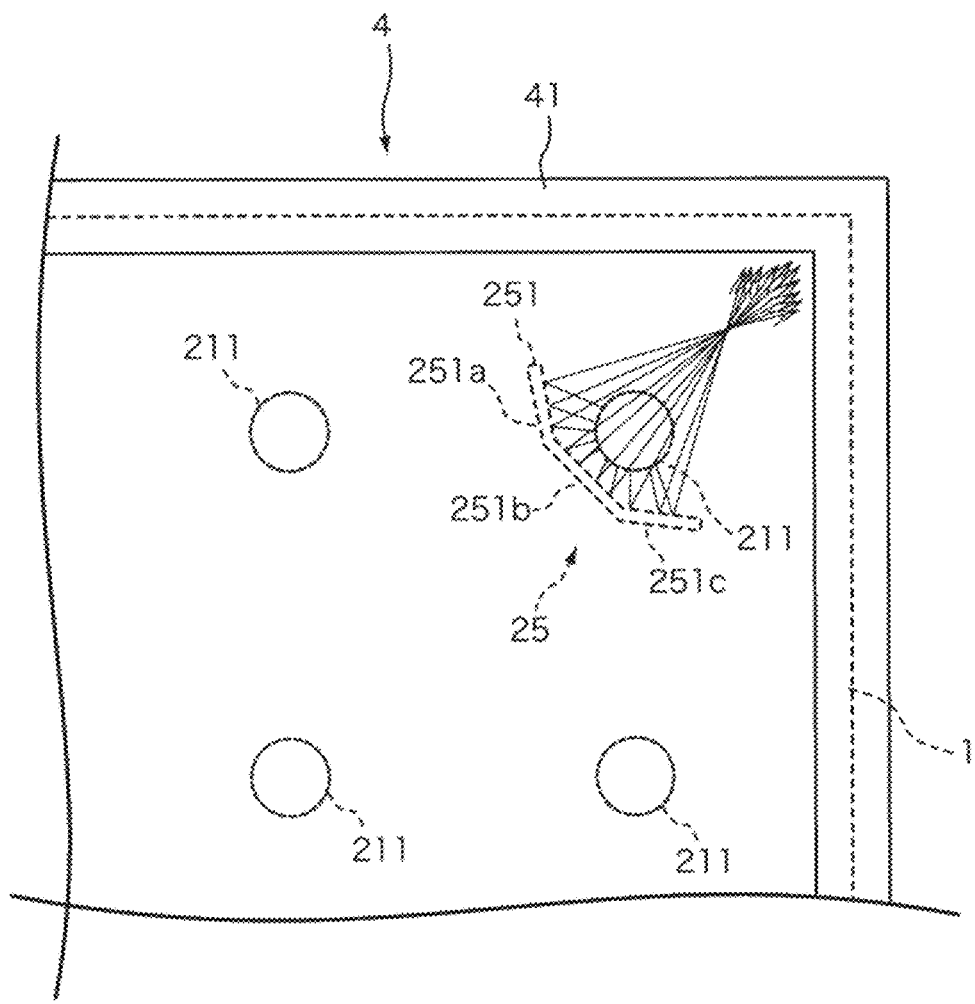
FIG. 10 is a partial front view illustrating another variation of the reflection member.

Also, the light quantity at the four corners of the liquid crystal panel 1 can be adjusted by changing arrangement of the three plate bodies 251a to 251c included in the reflection member 25 in the second embodiment, FIG. 10 is a partial front view illustrating a variation of the reflection member 25. In the variation illustrated in FIG. 10, position of the plate body 251b relative to the LED chip 211 and angle of the two plate bodies 251a and 251c relative to the plate body 251b are adjusted so that light reflected by the reflection member 25 is concentrated on the corresponding one of the four corners of the liquid crystal panel 1.

Note that the presently disclosed embodiments are merely examples in all aspects and should not be construed to be limiting. The scope of the present invention is indicated by the claims, rather than by the description given above, and includes all variations that are equivalent in meaning and scope to the claims. Any combinations of technical features described in the respective embodiments are possible.

REFERENCE SIGNS LIST

1 liquid crystal panel
2 light source section
3 panel chassis
4 bezel
21 LED substrate
22 diffusion plate
23 optical sheet
24, 25 reflection member
31 backside panel chassis
32 frontside panel chassis
211 LED chip
212 reflection sheet

The invention claimed is:

1. A display apparatus comprising:
   a rectangular display panel having one surface on which an image is displayed;
   a substrate on which a plurality of light sources are mounted, the substrate facing another surface of the display panel which is opposite to the one surface;
   a diffusion plate disposed between the display panel and the substrate;
   a support member having an opening through which light from the plurality of light sources passes and configured to support a peripheral portion of the diffusion plate; and
   a reflection member provided around one of the plurality of light sources located near one of four corners of the display panel, the reflection member being configured to reflect light from the one of the plurality of light sources toward the one of the four corners of the display panel, wherein
   the one of the plurality of light sources is disposed between the reflection member and the one of the four corners.

2. The display apparatus according to claim 1, wherein the reflection member is provided around the one of the plurality of light sources located closest to the one of the four corners of the display panel.

3. The display apparatus according to claim 2, wherein the reflection member has a light reflectivity of at least 85%.

4. The display apparatus according to claim 2, wherein the reflection member includes a surrounding wall open toward the one of the four corners of the display panel close to the reflection member.

5. The display apparatus according to claim 4, wherein the surrounding wall has an inner surface that is concave or flat.

6. The display apparatus according to claim 1, wherein the reflection member includes a surrounding wall open toward the one of the four corners of the display panel close to the reflection member.

7. The display apparatus according to claim 6, wherein the surrounding wall has an inner surface that is concave or flat.

8. The display apparatus according to claim 1, wherein the reflection member has a light reflectivity of at least 85%.

9. The display apparatus according to claim 1, wherein the reflection member has a reflection surface within a range from 90° to 270° relative to a straight line connecting a light source center of the one of the plurality of light sources and the one of the four corners of the display panel.

* * * * *